(12) United States Patent
Cheng et al.

(10) Patent No.: US 10,975,221 B2
(45) Date of Patent: Apr. 13, 2021

(54) CROSSLINKABLE COMPOSITION INCLUDING A (METH)ACRYLIC POLYMER AND METHODS OF MAKING A CROSSLINKED COMPOSITION

(71) Applicant: 3M INNOVATIVE PROPERTIES COMPANY, St. Paul, MN (US)

(72) Inventors: Shijing Cheng, Woodbury, MN (US); Sheng Ye, Woodbury, MN (US); David J. Yarusso, Shoreview, MN (US); Jianhui Xia, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 35 days.

(21) Appl. No.: 16/344,051

(22) PCT Filed: Oct. 17, 2017

(86) PCT No.: PCT/US2017/056909
§ 371 (c)(1),
(2) Date: Apr. 23, 2019

(87) PCT Pub. No.: WO2018/080834
PCT Pub. Date: May 3, 2018

(65) Prior Publication Data
US 2019/0256682 A1  Aug. 22, 2019

Related U.S. Application Data

(60) Provisional application No. 62/413,477, filed on Oct. 27, 2016.

(51) Int. Cl.
| | | |
|---|---|---|
| C08F 2/46 | (2006.01) | |
| C08F 2/50 | (2006.01) | |
| C08G 61/04 | (2006.01) | |
| C08K 5/07 | (2006.01) | |
| C09J 7/38 | (2018.01) | |
| C08K 5/00 | (2006.01) | |
| C08K 5/45 | (2006.01) | |
| C08K 5/56 | (2006.01) | |
| C08L 33/10 | (2006.01) | |
| C09J 133/10 | (2006.01) | |
| C09J 133/02 | (2006.01) | |

(52) U.S. Cl.
CPC ............. *C08K 5/07* (2013.01); *C08K 5/005* (2013.01); *C08K 5/0025* (2013.01); *C08K 5/45* (2013.01); *C08K 5/56* (2013.01); *C08L 33/10* (2013.01); *C09J 7/385* (2018.01); *C09J 133/02* (2013.01); *C09J 133/10* (2013.01); C08L 2312/06 (2013.01); C08L 2314/06 (2013.01)

(58) Field of Classification Search
CPC ........ C09J 7/385; C09J 133/02; C09J 133/10; C08K 5/005; C08K 5/45; C08K 5/0025; C08K 5/56; C08K 5/07; C08L 33/10; C08L 2312/06; C08L 2314/06
USPC ........... 522/75, 74, 71, 1, 189, 184, 6; 520/1
See application file for complete search history.

(56) References Cited

U.S. PATENT DOCUMENTS

| | | | |
|---|---|---|---|
| 3,535,295 A | * | 10/1970 | Davis ................ C09J 133/064 |
| | | | 525/193 |
| 4,069,123 A | * | 1/1978 | Skoultchi .............. C09J 133/06 |
| | | | 524/523 |
| 4,737,559 A | | 4/1988 | Kellen |
| 5,804,610 A | | 9/1998 | Hamer |
| 6,235,922 B1 | | 5/2001 | Robl |
| 6,613,819 B2 | | 9/2003 | Johnson |
| 6,831,114 B2 | | 12/2004 | Husemann |
| 6,841,587 B2 | | 1/2005 | Yamamoto |
| 6,974,850 B2 | | 12/2005 | McMan |
| 7,153,588 B2 | | 12/2006 | McMan |
| 7,279,069 B2 | | 10/2007 | Kobayashi |
| 7,410,667 B2 | | 8/2008 | Eisenhut |
| 7,510,764 B2 | | 3/2009 | Husemann |
| 7,968,614 B2 | | 6/2011 | Chudzik |
| 9,260,638 B2 | | 2/2016 | Krepski |
| 2010/0212824 A1 | | 8/2010 | Lionberger |

(Continued)

FOREIGN PATENT DOCUMENTS

| | | |
|---|---|---|
| CN | 101511959 | 8/2009 |
| CN | 102773211 | 11/2012 |
| EP | 2371902 | 10/2011 |

(Continued)

OTHER PUBLICATIONS

Fujisawa etal, WO 2010073649 Machine Translation, Jul. 1, 2010 (Year: 2010).*
Albuquerque et al, Degree of Conversion, Depth of Cure, and Color Stability of Experimental Dental Composite Formulated with Camphorquinone and Phenanthrenequinone Photoinitiators, Apr. 2015, Journal of Esthetic and Restorative Dentistry, vol. 27, No. 51, 549-557 (Year: 2015).*
Czech, et al., Chemik, 2014, vol. 68, No. 1, pp. 53-60.
Pocius, Adhesion and Adhesives Technology: An Introduction, 2nd Ed., 2002.

(Continued)

*Primary Examiner* — Jessica Whiteley
(74) *Attorney, Agent, or Firm* — Adrian L. Pishko

(57) ABSTRACT

The present disclosure provides a crosslinkable composition including a (meth)acrylate polymer and a visible light absorbing compound. Two percent or less of the carbon-carbon bonds in the crosslinkable composition are double bonds. The composition allows for inclusion of one or more materials degradable by ultraviolet radiation and/or stabilized against ultraviolet radiation. Methods for making a crosslinked composition is also provided. One method includes obtaining a crosslinkable composition and subjecting the crosslinkable composition to radiation having a wavelength of 400 nm or greater. Another method includes subjecting a crosslinkable composition to first and second radiations that are different from each other.

17 Claims, No Drawings

(56) References Cited

U.S. PATENT DOCUMENTS

2014/0120268 A1  5/2014  Akiyama
2015/0044490 A1  2/2015  Kurimura

FOREIGN PATENT DOCUMENTS

| EP | 2371920 | 10/2011 | |
| EP | 2371920 A1 * | 10/2011 | ......... A61F 13/0206 |
| JP | 59-176370 | 10/1984 | |
| JP | H10-120982 | 5/1998 | |
| JP | 2013-221100 | 10/2013 | |
| JP | 2014-106305 | 6/2014 | |
| WO | WO-2010073649 A1 * | 7/2010 | ........... C09D 133/06 |
| WO | WO 2014-099317 | 6/2014 | |
| WO | WO 2016-133669 | 8/2016 | |
| WO | WO 2016-196561 | 12/2016 | |

OTHER PUBLICATIONS

International Search Report for PCT International Application No. PCT/US2017/056909, dated Feb. 28, 2018, 6 pages.

* cited by examiner

CROSSLINKABLE COMPOSITION INCLUDING A (METH)ACRYLIC POLYMER AND METHODS OF MAKING A CROSSLINKED COMPOSITION

CROSS REFERENCE TO RELATED APPLICATIONS

This application is a national stage filing under 35 U.S.C. 371 of PCT/US2017/056909, filed Oct. 17, 2017, which claims the benefit of U.S. Application No. 62/413,477, filed Oct. 27, 2016, the disclosure of which is incorporated by reference in their entireties herein.

TECHNICAL FIELD

The present disclosure relates to the field of crosslinkable polymeric compositions.

BACKGROUND

Curing using ultraviolet (UV) radiation has been developed due to the need for short curing times and one-part compositions, and has expanded into commercial use for materials such as inks, sealants, and adhesives. Certain materials (e.g., in optical applications) that are vulnerable to ultraviolet rays, UV stabilized, and/or including multilayer structures, however, are less suitable for curing by UV radiation. This presents a challenge in bonding such materials using adhesives that require ultraviolet radiation curing/post-curing.

SUMMARY

The present disclosure provides a crosslinkable composition and methods of making a crosslinked composition.

In a first aspect, a crosslinkable composition is provided. The crosslinkable composition comprises a (meth)acrylate polymer; and a visible light absorbing compound of one of the following formulae (I), (II), or (III):

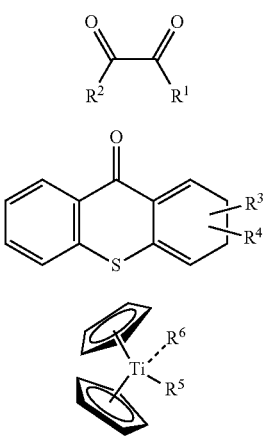

wherein:
$R^1$ and $R^2$ are independently selected from an alkyl group, a phenyl group, an alkyl-substituted phenyl group, a heteroaromatic group, an alkyl-substituted heteroaromatic group, and $R^1$ and $R^2$ may be taken together to form a ring of up to seven carbons;

$R^3$ and $R^4$ are independently selected from H, a halogen, an alkyl group, and a carboxyl group;

$R^5$ and $R^6$ are independently selected from a phenyl group, an alkyl-substituted phenyl group, a heteroaromatic group, an alkyl- or chloride-substituted heteroaromatic group, and formula (IV):

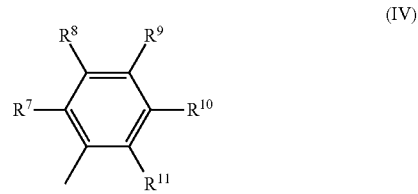

wherein:
$R^7$ is a halogen;
$R^8$ is H;
$R^9$ is a heteroaryl;
$R^{10}$ is H; and
$R^{11}$ is a halogen; and
wherein 2% or less of any carbon-carbon bonds in the crosslinkable composition are double bonds.

In a second aspect, a method of making a crosslinked composition is provided. The method includes obtaining a crosslinkable composition according to the first aspect; and subjecting the crosslinkable composition to radiation having a wavelength of 400 nm or greater.

In a third aspect, another method of making a crosslinked composition is provided. The method includes obtaining a crosslinkable composition comprising a (meth)acrylate polymer; an ultraviolet absorbing crosslinker compound; and a visible light absorbing compound of one of the formulae (I), (II), or (III) according to the first aspect; wherein 2% or less of any carbon-carbon bonds in the crosslinkable composition are double bonds. The method further includes subjecting the crosslinkable composition to a first radiation to form a partially crosslinked crosslinkable composition; and subjecting the partially crosslinked crosslinkable composition to a second radiation. The first radiation and the second radiation are different. One of the first radiation and the second has a wavelength of 400 nm or greater and the other has a wavelength of less than 400 nm.

Features and advantages of the present disclosure will be further understood upon consideration of the detailed description as well as the appended claims.

DETAILED DESCRIPTION

Glossary

As used herein:
"(meth)acrylate" or "acrylate" is a shorthand reference to acrylate, methacrylate, or combinations thereof; "(meth)acrylic" or "acrylic" is a shorthand reference to acrylic, methacrylic, or combinations thereof; and "(meth)acryloyl" is a shorthand reference to acryloyl, methacryloyl, or combinations thereof.

"alkyl" includes straight-chained, branched, and cycloalkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl, and the like. Unless otherwise noted, alkyl groups may be mono- or polyvalent, i.e., monovalent alkyl or polyvalent alkylene.

"heteroalkyl" includes both straight-chained, branched, and cyclic alkyl groups with one or more heteroatoms independently selected from S, O, and N with both unsubstituted and substituted alkyl groups. Unless otherwise indicated, the heteroalkyl groups typically contain from 1 to 20 carbon atoms. Examples of "heteroalkyl" as used herein include, but are not limited to, methoxy, ethoxy, propoxy, 3,6-dioxaheptyl, 3-(trimethylsilyl)-propyl, 4-dimethylaminobutyl, and the like. Unless otherwise noted, heteroalkyl groups may be mono- or polyvalent, i.e., monovalent heteroalkyl or polyvalent heteroalkylene.

By "carboxyl" is meant —COOH groups, it being understood that such groups can exist in their neutral (—COOH) form, or can exist in their deprotonated (—COO) form.

"halogen" includes F, Cl, Br, and I.

"aryl" is an aromatic group containing 5-18 ring atoms and can contain optional fused rings, which may be saturated, unsaturated, or aromatic. Examples of an aryl groups include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl groups are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent, i.e., monovalent aryl or polyvalent arylene.

"heteroaromatic" is an aromatic group containing 1-3 heteroatoms such as nitrogen, oxygen, or sulfur, and can contain fused rings, e.g., substituted phenyl groups.

"acryloyl" is used in a generic sense and mean not only derivatives of acrylic acid, but also amine, and alcohol derivatives, respectively. "(meth)acryloyl" includes both acryloyl and methacryloyl groups; i.e., is inclusive of both esters and amides.

The present disclosure provides a crosslinking technique based on visible light initiators, which do not require any unsaturation functionality present in a polymer to be crosslinked (or in any residual monomers that remain after preparing the polymer). Most commercial visible light initiators are type II initiators which generate radicals through hydrogen abstraction other than unimolecular cleavage, thus require less energy. They could be used to free-radical polymerize acrylate and methacrylate monomers and generally require partners such as amine and iodonium salt co-initiators. It has been unexpectedly discovered that such visible light initiators could be used as crosslinkers to crosslink polymers (e.g., pressure sensitive adhesive (PSA) polymers). Without wishing to be bound by theory, it is hypothesized that these initiators are triggered by visible light hydrogen abstraction from the polymer backbone, which then crosslinks with the initiators.

In a first aspect, a crosslinkable composition is provided. The crosslinkable composition comprises a (meth)acrylate polymer; and a visible light absorbing compound of one of the following formulae (I), (II), or (III):

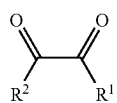
(I)

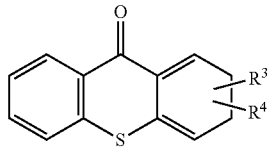
(II)

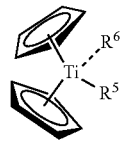
(III)

wherein $R^1$ and $R^2$ are independently selected from an alkyl group, a phenyl group, an alkyl-substituted phenyl group, a heteroaromatic group, an alkyl-substituted heteroaromatic group, and $R^1$ and $R^2$ may be taken together to form a ring of up to seven carbons;

$R^3$ and $R^4$ are independently selected from H, a halogen, an alkyl group, and a carboxyl group;

$R^5$ and $R^6$ are independently selected from a phenyl group, an alkyl-substituted phenyl group, a heteroaromatic group, an alkyl- or chloride-substituted heteroaromatic group, and formula (IV):

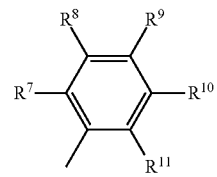
(IV)

wherein $R^7$ is a halogen;

$R^8$ is H;

$R^9$ is a heteroaryl;

$R^{10}$ is H; and $R^{11}$ is a halogen; and wherein 2% or less of any carbon-carbon bonds in the crosslinkable composition are double bonds.

In a second aspect, a method of making a crosslinked composition is provided. The method includes obtaining a crosslinkable composition according to the first aspect; and subjecting the crosslinkable composition to radiation having a wavelength of 400 nm or greater.

The below disclosure relates to both the first aspect and the second aspect.

In many embodiments, the crosslinkable composition is useful as a pressure sensitive adhesive (PSA) and/or a hot melt adhesive. Hence, the crosslinkable composition optionally comprises a pressure sensitive adhesive comprising the (meth)acrylate polymer. According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherends, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface. These requirements are assessed generally by means of tests which are designed to individually measure tack, adhesion (peel strength), and cohesion (shear holding power), as noted in A. V. Pocius in Adhesion and Adhesives Technology: An Introduction, 2nd Ed., Hanser Gardner Publication, Cincinnati, Ohio, 2002. These measurements taken together constitute the balance of properties often used to characterize a PSA.

The method of preparing the (meth)acrylate polymer is not particularly limited; the (meth)acrylate polymer can be formed by solution polymerization, emulsion polymerization, suspension polymerization, or bulk polymerization, as known to the skilled practitioner. Hence, typical initiation methods of polymerizing the (meth)acrylate polymer from a polymerizable composition include ultraviolet radiation initiation and thermal initiation of polymerization of the (meth) acrylate polymer. It is possible that polymerization of the (meth)acrylate polymer results in a certain amount of crosslinking of the polymer, or that it may deliberately be crosslinked to some extent (e.g., thermally and/or photochemically); therefore in some embodiments of the crosslinkable composition the (meth)acrylate polymer is partially crosslinked. In other embodiments, the (meth)acrylate polymer in the crosslinkable composition is uncrosslinked.

In some embodiments, the (meth)acrylate polymer comprises the reaction product of a polymerizable composition comprising a chain transfer agent, a polar monomer, and at least one alkyl (meth)acrylate. Suitable representative chain transfer agents, polar monomers, and alkyl (meth)acrylate monomers are each described in detail below.

As noted above, visible light initiators according to at least certain embodiments of the present disclosure do not require any unsaturation functionality present in a polymer for the polymer to undergo crosslinking. Some minor amount of a polymer can include carbon-carbon double bonds (e.g., ethylenically unsaturated bonds), which is often due to incomplete polymerization of the polymerizable composition. The carbon-carbon double bonds may thus be provided by the (meth)acrylate polymer in combination with any residual monomer. For instance, the 2% or less of carbon-carbon double bonds usually comprise at least one of (meth)acrylate polymer backbone bonds, (meth)acrylate polymer pendent group bonds, or (meth)acrylate monomer bonds. The amount of carbon-carbon double bonds of a (meth)acrylate polymer, a crosslinkable composition, or a crosslinked composition is readily determined using analytical techniques such as $^1$H-NMR spectroscopy, $^{13}$C-NMR spectroscopy, or infrared spectroscopy, most preferably $^1$H-NMR spectroscopy.

The use of visible light provides various advantages, such as high light penetrability; safety, and lost cost. More particularly, the high light penetrability permits the use of a filler mixed with an adhesive and a resin for semi- to non-transparent materials. Visible light penetrates deeper into such materials due to its long wavelengths, as compared to light having shorter wavelengths. Regarding safety, visible light is safe to the skin of the human body, unlike the damaging effects to skin that can be caused by exposure to shorter wavelengths (e.g., UV radiation). Further, the use of visible light radiation is inexpensive and readily commercially available. Suitable visible light radiation sources have been available for years, including halogen lamps, laser diodes, mercury lamps, excimer lamps, and visible Light Emitting Diodes (LEDs). LED visible light radiation sources can be particularly suitable because they are capable of generating visible light over a much narrower wavelength range as compared to halogen lamps and mercury lamps. In certain embodiments, the radiation is provided by a light emitting diode, a mercury lamp, an excimer lamp, or a combination thereof.

Employing the visible light radiation further allows for use of a layer of a UV absorbing (yet visible light transmissive) polymer or glass disposed between the crosslinkable composition and the radiation during subjection of the crosslinkable composition to the radiation. For instance and without limitation, the UV absorbing and visible light transmissive polymer may comprise polyolefins such as polyethylene and its copolymers, polyethylene terephthalate (PET), polymethyl methacrylate (PMMA), polyvinyl chloride (PVC), polystyrene, or polycarbonate. The capability of passing the visible light radiation through a polymer or glass can be advantageous, particularly when crosslinking a polymer present in a multilayer structure.

Certain ultraviolet radiation sources have radiation spectra that include some visible light radiation, and may be useful to crosslink at least certain embodiments of the crosslinkable compositions of the present disclosure. It is noted that the amount of time required to achieve a desired amount of crosslinking might be extensive due to the low intensity of such visible light radiation, however. In some embodiments, the visible light is provided by a radiation source that has an output wavelength of 400 nanometers (nm) or greater, 420 nm or greater, 430 nm or greater; and an output wavelength of 560 nm or less, 540 nm or less, 520 nm or less, or 500 nm or less. Stated another way, the visible light may be provided by a radiation source that has an output wavelength in the range of 400 nm to 560 nm, inclusive, 400 nm to 500 nm, inclusive, or 430 nm to 500 nm, inclusive.

In certain embodiments of the visible light absorbing compound, the compound is of formula (I):

(I)

wherein $R^1$ and $R^2$ are independently selected from an alkyl group, a phenyl group, an alkyl-substituted phenyl group, a heteroaromatic group, an alkyl-substituted heteroaromatic group, and $R^1$ and $R^2$ may be taken together to form a ring of up to seven carbons. Optionally, $R^1$ and $R^2$ are independently selected from an alkyl group and a phenyl group, and $R^1$ and $R^2$ may be taken together to form a ring of up to seven carbons. Examples of suitable visible light absorbing compounds that are encompassed by formula (I) include for instance and without limitation, camphorquinone, phenanthrenequinone, and benzil.

In certain embodiments of the visible light absorbing compound, the compound is of formula (II):

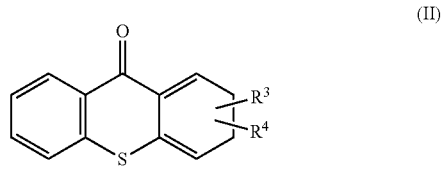

(II)

wherein $R^3$ and $R^4$ are independently selected from H, a halogen, an alkyl group, and a carboxyl group. Optionally, $R^3$ and $R^4$ are independently selected from H and a halogen. Examples of suitable visible light absorbing compounds that are encompassed by formula (II) include for instance and without limitation, 2,4-isopropylthioxanthone, 2,4-diethylthioxanthone (e.g., available under the trade designation KAYACURE DETX from Nippon Kayaku Co., Ltd., (Tokyo, Japan)), 2,4-dimethylthioxanthone (e.g., available under the trade designation KAYACURE RTX from Nippon Kayaku Co., Ltd.), 2,4-diisopropylthioxanthone (e.g., available under the trade designation KAYACURE DITX from Nippon Kayaku Co., Ltd.), 2-chlorothioxanthone (e.g., available under the trade designation KAYACURE CTX from Nippon Kayaku Co., Ltd.), 1-chloro-4-propoxythioxanthone (e.g., available under the trade designation SPEEDCURE CPTX from Lambson Ltd. (West Yorkshire, United Kingdom)), and 1,3-ethylthioxanthone carboxylate.

In certain embodiments of the visible light absorbing compound, the compound is of formula (III):

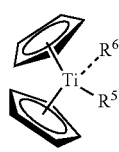

(III)

wherein $R^5$ and $R^6$ are independently selected from a phenyl group, an alkyl-substituted phenyl group, a heteroaromatic group, an alkyl- or chloride-substituted heteroaromatic group, and formula (IV):

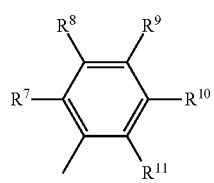

(IV)

wherein $R^7$ is a halogen;
$R^8$ is H;
$R^9$ is a heteroaryl;
$R^{10}$ is H; and
$R^{11}$ is a halogen. Optionally, $R^5$ and $R^6$ are each of formula (IV). A suitable visible light absorbing compound encompassed by formula (III) includes for example bis(h5-2,4-cyclopentadien-1-yl)bis[2,6-difluoro-3-(1H-pyrrol-1-yl) phenyl]-titanium (e.g., available under the trade designation IRGACURE 784 from BASF Corporation (Florham Park, N.J.)).

The visible light absorbing compound is capable of generating at least one reactive species (e.g., a free radical, a cation, etc.) upon exposure to visible light radiation. Advantageously, in many embodiments the visible light absorbing compound can initiate crosslinking of a polymer. In some embodiments, the visible light absorbing compound comprises a visible light activated photoinitiator. The visible light activated photoinitiator also is capable of generating at least one reactive species upon exposure to visible light radiation (and may initiate crosslinking). For instance, Type I and Type II photoinitiators are discussed in the Examples below. In select embodiments, the visible light absorbing compound comprises camphorquinone, phenanthrenequinone, or 2-chlorothioxanthone. Typically, the visible light absorbing compound is present in amounts less than 5 parts based on total dry weight of the (meth)acrylate polymer. More specifically, the visible light absorbing compound may be present in amounts from 0.01 to 5 parts, preferably 0.05 to 1 parts, based on 100 parts total (meth)acrylate polymer used. In certain embodiments, the visible light absorbing compound has a peak absorbance between 400 nm and 500 nm.

Examples of suitable alkyl (meth)acrylate monomers for the polymerizable composition include, but are not limited to, methyl methacrylate, ethyl methacrylate, propyl methacrylate, n-butyl methacrylate, sec-butyl methacrylate, isobutyl methacrylate, tert-butyl methacrylate, n-hexyl methacrylate, cyclohexyl methacrylate, 2-ethylhexyl (meth) acrylate, isooctyl acrylate, n-octyl methacrylate, and 3,3,5-trimethylcyclohexyl methacrylate, and isobornyl (meth) acrylate.

Representative examples of suitable non-acid functional polar monomers include, but are not limited to, 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth)acrylate, 2-ethoxyethyl (meth)acrylate, 2-methoxyethoxyethyl (meth) acrylate, 2-methoxyethyl methacrylate, polyethylene glycol mono(meth)acrylates; alkyl vinyl ethers, including vinyl methyl ether; and mixtures thereof. Preferred polar monomers include those selected from the group consisting of 2-hydroxyethyl (meth)acrylate and N-vinylpyrrolidinone.

Representative examples of suitable acid functional polar monomers include, but are not limited to, monomers where the acid functional group may be an acid per se, such as a carboxylic acid, or a portion may be salt thereof, such as an alkali metal carboxylate. Useful acid functional polar monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, carboxyethyl (meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional polar monomers are generally selected from ethylenically unsaturated carboxylic acids, e.g., (meth)acrylic acids. When even stronger acids are desired, acidic polar monomers include the ethylenically unsaturated sulfonic acids and ethylenically unsaturated phosphonic acids may be used. The acid functional polar monomer is generally used in amounts of 1 to 15 parts by weight, preferably 1 to 10 parts by weight, based on 100 parts by weight total monomer.

The monomer mixture may comprise: 50-99 parts by weight of alkyl (meth)acrylate monomers; and 1-50 parts by weight of polar monomers, (inclusive of acid-functional polar monomers); wherein the sum of the monomers is 100 parts by weight.

The polymerizable composition may optionally further comprise chain transfer agents to control the molecular weight of the resultant (meth)acrylate polymer. Examples of useful chain transfer agents include but are not limited to those selected from the group consisting of carbon tetrabromide, alcohols, mercaptans, and mixtures thereof. When present, the preferred chain transfer agents are isooctyl mercaptoacetate (e.g., commercially available from Evans Chemetics LP (Teaneck, N.J.)) and carbon tetrabromide. The polymerizable composition may further comprise up to about 0.5 parts by weight of a chain transfer agent, typically about 0.01 to about 0.5 parts by weight, if used, preferably about 0.05 parts by weight to about 0.2 parts by weight, based upon 100 parts by weight of the total monomer mixture.

In some embodiments, the polymerizable composition further comprises one or more ultraviolet radiation absorbing compounds. Similarly, the resulting (meth)acrylate polymer optionally comprises at least one ultraviolet radiation absorbing functional group that has been incorporated into the polymer during polymerization. The one or more ultraviolet radiation absorbing compounds can serve as a stabilizer to ultraviolet radiation, as an ultraviolet crosslinker, or both. Further, an ultraviolet radiation absorbing functional group can perform the function for the polymer of a stabilizer from subsequent ultraviolet radiation.

The optional ultraviolet radiation absorbing compound may comprise a benzotriazole, benzatriazine, benzophenone, or a combination thereof; or it may be any of those described in U.S. Pat. No. 6,613,819 (Johnson et al.), U.S. Pat. No. 6,974,850 (McMann et al.), and U.S. Pat. No. 7,153,588 (McMann et al.); all incorporated herein by reference for all that they contain. Some particular examples include CGL 139, CGL 777, and TINUVIN 327, 460, 479, 480, 777, 900, and 928; all from BASF Corporation (Florham Park, N.J.)). The ultraviolet radiation absorbing compound may also comprise a combination of UV absorbers, for example, CGL 479 in combination with CGL 777.

In certain embodiments, the ultraviolet radiation absorbing compound or functional group comprises a benzophenone or benzophenone derivative. Specific examples of multi-functional benzophenones include 1,5-bis(4-benzoylphenoxy)pentane, 1,9-bis(4-benzoylphenoxy)nonane, and 1,11-bis(4-benzoylphenoxy)undecane. Specific examples of monofunctional benzophenones include benzophenone, 4-phenylbenzophenone, 4-methoxybenzophenone, 4,4'-dimethoxybenzophenone, 4,4'-dimethylbenzophenone, 4-methylbenzophenone, 4-(2-hydroxyethylthio)-benzophenone, and 4-(4-tolylthio)-benzophenone. Specific examples of copolymerizable benzophenones include 4-acryloyloxy benzophenone (ABP), para-acryloxyethoxybenzophenone (AEBP), para-N-(methylacryloxyethyl)-carbamoylethoxybenzophenone, 4-acryloyloxydiethoxy-4-chlorobenzophenone, para-acryloxyacetophenone, and ortho-acrylamidoacetophenone. Other useful benzophenone chromophores are described in U.S. Pat. No. 6,235,922 (Heilmann et al).

Further useful ultraviolet radiation absorbing compounds include triazines, such as triazine crosslinking agents described in U.S. Pat. No. 9,260,638 (Krepski et al).

Exemplary suitable ultraviolet radiation absorbing compounds for use as stabilizers include 5-trifluoromethyl-2-(2-hydroxy-3-alpha-cumyl-5-tert-octylphenyl)-2H-benzotriazole, 2-(2-hydroxy-3,5-di-alpha-cumylphehyl)-2H-benzotriazole, 5-chloro-2-(2-hydroxy-3-tert-butyl-5-methylphenyl)-2H-benzotiazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole, 2(-4,6-diphenyl-1-3,5-triazin-2-yl)-5-hexcyloxy-phenol, and combinations thereof.

Additional suitable ultraviolet radiation absorbing compounds for use as stabilizers include hindered amine light stabilizers (HALS). HALS are light stabilizers rather than absorbers and scavenge radicals by production of nitroxyl radicals. Some exemplary HALS include, for example, cyclic amines, secondary, tertiary, acetylated, N-hydrocarbyloxy substituted, hydroxy substituted N-hydrocarbyloxy substituted, or other substituted cyclic amines which are further characterized by a degree of steric hindrance, generally as a result of substitution of an aliphatic group or groups on the carbon atoms adjacent to the amine function. For instance, HALS can be derivatives of 2,2,6,6,-tetramethyl piperidine. Various suitable HALS are commercially available from BASF Corporation (Florham Park, N.J.)) under the trade designation TINUVIN 152, 123, 144, and 292.

In certain embodiments, the crosslinkable composition further comprises a solvent, such as when the (meth)acrylate polymer is formed using solution polymerization. Suitable solvents include for instance and without limitation, methanol, tetrahydrofuran, ethanol, isopropanol, acetone, methyl ethyl ketone, methyl acetate, ethyl acetate, toluene, xylene, and an ethylene glycol alkyl ether. These solvents can be used alone or as mixtures thereof.

The crosslinkable composition may further include optional components such as other thermoplastic resins (e.g., polyester, polycarbonate), pigments, dyes, fillers, and UV stabilizers (e.g., antioxidants).

In some instances, it may be desirable to crosslink a crosslinkable composition in a multistep process (e.g., when the composition needs to maintain a certain shape prior to its incorporation into a product, such as during transportation from the manufacturer). A crosslinkable composition can thus be partially crosslinked using radiation, then subsequently be further crosslinked also using radiation. More particularly, in a third aspect, a method of making a crosslinked composition is provided comprising:

obtaining a crosslinkable composition comprising a (meth)acrylate polymer; an ultraviolet absorbing crosslinker compound; and a visible light absorbing compound of one of the following formulae (I), (II), or (III):

(I)

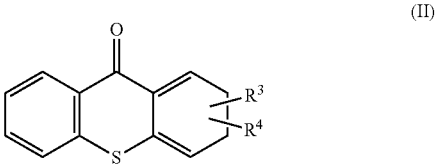

(II)

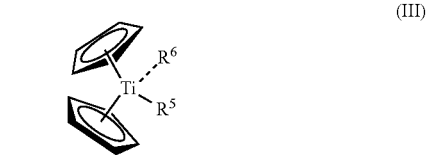

(III)

wherein $R^1$ and $R^2$ are independently selected from an alkyl group, a phenyl group, an alkyl-substituted phenyl group, a heteroaromatic group, an alkyl-substituted heteroaromatic group, and $R^1$ and $R^2$ may be taken together to form a ring of up to seven carbons;

$R^3$ and $R^4$ are independently selected from H, a halogen, an alkyl group, and a carboxyl group;

$R^5$ and $R^6$ are independently selected from a phenyl group, an alkyl-substituted phenyl group, a heteroaromatic group, an alkyl- or chloride-substituted heteroaromatic group, and formula (IV):

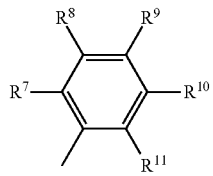

(IV)

wherein
$R^7$ is a halogen;
$R^8$ is H;
$R^9$ is a heteroaryl;
$R^{10}$ is H; and
$R^{11}$ is a halogen;
wherein 2% or less of any carbon-carbon bonds in the crosslinkable composition are double bonds;

subjecting the crosslinkable composition to a first radiation to form a partially crosslinked crosslinkable composition; and subjecting the partially crosslinked crosslinkable composition to a second radiation;

wherein the first radiation and the second radiation are different; and wherein one of the first radiation and the second has a wavelength of 400 nm or greater and the other has a wavelength of less than 400 nm.

The visible light absorbing compound, (meth)acrylate polymer, other optional components of the crosslinkable composition, radiation sources, and radiation having a wavelength of 400 nm or greater are each as described in detail above with respect to the first and second aspects. Moreover, the ultraviolet absorbing crosslinker compound usually comprises one or more of the ultraviolet absorbing compounds described above with respect to the first and second aspects. In certain embodiments, the ultraviolet absorbing crosslinker compound comprises a benzotriazole, a benzatriazine, a benzophenone, or a combination thereof.

In some embodiments, the radiation having a wavelength of less than 400 nm includes wavelengths of 200 nm or greater, 250 nm or greater, 275 nm or greater, 300 nm or greater, or 325 nm or greater; and 399 nm or less, 395 nm or less, 390 nm or less, 380 nm or less, 370 nm or less, or 360 nm or less. Stated another way, the radiation having a wavelength of less than 400 nm typically comprises radiation having a peak wavelength between 200 nm and 395 nm, inclusive, or radiation having a peak wavelength between 300 nm and 395 nm, inclusive.

In certain embodiments, the first radiation has a wavelength of less than 400 nm and the second radiation has a wavelength of 400 nm or greater, whereas in other embodiments the first radiation has a wavelength of 400 nm or greater and the second radiation has a wavelength of less than 400 nm. As also discussed above, optionally a layer of a UV absorbing and visible light transmissive glass or polymer is disposed between the crosslinkable composition and the radiation during the subjecting the crosslinkable composition to the radiation having a wavelength of 400 nm or greater.

EMBODIMENTS

Embodiment 1 is a crosslinkable composition comprising a (meth)acrylate polymer; and a visible light absorbing compound of one of the following formulae (I), (II), or (III):

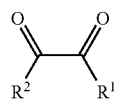

(I)

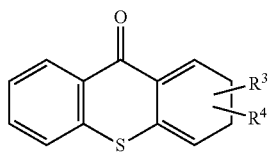

(II)

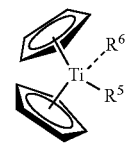

(III)

wherein
$R^1$ and $R^2$ are independently selected from an alkyl group, a phenyl group, an alkyl-substituted phenyl group, a heteroaromatic group, an alkyl-substituted heteroaromatic group, and $R^1$ and $R^2$ may be taken together to form a ring of up to seven carbons;

$R^3$ and $R^4$ are independently selected from H, a halogen, an alkyl group, and a carboxyl group;

$R^5$ and $R^6$ are independently selected from a phenyl group, an alkyl-substituted phenyl group, a heteroaromatic group, an alkyl- or chloride-substituted heteroaromatic group, and formula (IV):

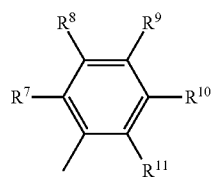

(IV)

wherein $R^7$ is a halogen; $R^8$ is H; $R^9$ is a heteroaryl; $R^{10}$ is H; and $R^{11}$ is a halogen; wherein 2% or less of carbon-carbon bonds in the crosslinkable composition are double bonds.

Embodiment 2 is the crosslinkable composition of embodiment 1, wherein the crosslinkable composition comprises a pressure sensitive adhesive comprising the (meth)acrylate polymer.

Embodiment 3 is the crosslinkable composition of embodiment 1 or embodiment 2, wherein the (meth)acrylate polymer is partially crosslinked.

Embodiment 4 is the crosslinkable composition of embodiment 1 or embodiment 2, wherein the (meth)acrylate polymer is uncrosslinked.

Embodiment 5 is the crosslinkable composition of any of embodiments 1 to 4, further comprising a solvent.

Embodiment 6 is the crosslinkable composition of any of embodiments 1 to 5, wherein the 2% or less ethylenically unsaturated bonds comprise at least one of (meth)acrylate polymer backbone bonds, (meth)acrylate polymer pendent group bonds, or (meth)acrylate monomer bonds.

Embodiment 7 is the crosslinkable composition of any of embodiments 1 to 6, wherein the visible light absorbing compound has a peak absorbance between 400 nm and 500 nm.

Embodiment 8 is the crosslinkable composition of any of embodiments 1 to 7, wherein $R^1$ and $R^2$ are independently selected from an alkyl group and a phenyl group, and $R^1$ and $R^2$ may be taken together to form a ring of up to seven carbons.

Embodiment 9 is the crosslinkable composition of any of embodiments 1 to 8, wherein $R^3$ and $R^4$ are independently selected from H and a halogen.

Embodiment 10 is the crosslinkable composition of any of embodiments 1 to 9, wherein $R^5$ and $R^6$ are each of formula (IV).

Embodiment 11 is the crosslinkable composition of any of embodiments 1 to 10, wherein the visible light absorbing compound comprises camphorquinone, phenanthrenequinone, or 2-chlorothioxanthone.

Embodiment 12 is the crosslinkable composition of any of embodiments 1 to 11, wherein the (meth)acrylate polymer comprises the reaction product of a polymerizable composition comprising a chain transfer agent, a polar monomer, and at least one alkyl (meth)acrylate.

Embodiment 13 is the crosslinkable composition of embodiment 12, wherein the polymerizable composition further comprises an ultraviolet radiation absorbing compound.

Embodiment 14 is the crosslinkable composition of any of embodiments 1 to 13, wherein the (meth)acrylate polymer comprises at least one ultraviolet radiation absorbing functional group.

Embodiment 15 is the crosslinkable composition of embodiment 13 or embodiment 14, wherein the ultraviolet radiation absorbing compound or functional group comprises a benzophenone or benzophenone derivative.

Embodiment 16 is a method of making a crosslinked composition, the method comprising obtaining a crosslinkable composition according to claim 1; and subjecting the crosslinkable composition to radiation having a wavelength of 400 nm or greater.

Embodiment 17 is the method of embodiment 16, wherein the (meth)acrylate polymer is formed by solution polymerization, emulsion polymerization, suspension polymerization, or bulk polymerization.

Embodiment 18 is the method of embodiment 16 or embodiment 17, comprising ultraviolet initiation of polymerization of the (meth)acrylate polymer.

Embodiment 19 is the method of embodiment 16 or embodiment 17, comprising thermal initiation of polymerization of the (meth)acrylate polymer.

Embodiment 20 is the method of any of embodiments 16 to 19, wherein the radiation is provided by a light emitting diode, a mercury lamp, an excimer lamp, or a combination thereof.

Embodiment 21 is the method of embodiment 20, wherein the radiation is provided by a light emitting diode having a peak wavelength of 400 nm or greater.

Embodiment 22 is the method of any of embodiments 16 to 21, wherein a layer of a UV absorbing and visible light transmissive polymer is disposed between the crosslinkable composition and the radiation during the subjecting the crosslinkable composition to the radiation.

Embodiment 23 is the method of embodiment 22, wherein the UV absorbing and visible light transmissive polymer comprises polyethylene terephthalate.

Embodiment 24 is the method of any of embodiments 16 to 23, wherein the crosslinkable composition comprises a pressure sensitive adhesive comprising the (meth)acrylate polymer.

Embodiment 25 is the method of any of embodiments 16 to 24, wherein the (meth)acrylate polymer is partially crosslinked.

Embodiment 26 is the method of any of embodiments 16 to 24, wherein the (meth)acrylate polymer is uncrosslinked.

Embodiment 27 is the method of any of embodiments 16 to 26, wherein the crosslinkable composition further comprises a solvent.

Embodiment 28 is the method of any of embodiments 16 to 27, wherein the 2% or less of carbon-carbon bonds in the crosslinkable composition that are double bonds comprise at least one of (meth)acrylate polymer backbone bonds, (meth)acrylate polymer pendent group bonds, or (meth)acrylate monomer bonds.

Embodiment 29 is the method of any of embodiments 16 to 28, wherein the visible light absorbing compound has a peak absorbance between 400 nm and 500 nm.

Embodiment 30 is the method of any of embodiments 16 to 29, wherein $R^1$ and $R^2$ are independently selected from an alkyl group and a phenyl group, and $R^1$ and $R^2$ may be taken together to form a ring of up to seven carbons.

Embodiment 31 is the method of any of embodiments 16 to 30, wherein $R^3$ and $R^4$ are independently selected from H and a halogen.

Embodiment 32 is the method of any of embodiments 16 to 31, wherein $R^5$ and $R^6$ are each of formula (IV).

Embodiment 33 is the method of any of embodiments 16 to 32, wherein the visible light absorbing compound comprises camphorquinone, phenanthrenequinone, or 2-chlorothioxanthone.

Embodiment 34 is the method of any of embodiments 16 to 33, wherein the (meth)acrylate polymer comprises the reaction product of a polymerizable composition comprising a chain transfer agent, a polar monomer, and at least one alkyl (meth)acrylate.

Embodiment 35 is the method of embodiment 34, wherein the polymerizable composition further comprises an ultraviolet radiation absorbing compound.

Embodiment 36 is the method of any of embodiments 16 to 35, wherein the (meth)acrylate polymer comprises at least one ultraviolet radiation absorbing functional group.

Embodiment 37 is the method of embodiment 35 or embodiment 36, wherein the ultraviolet radiation absorbing compound or functional group comprises a benzophenone or benzophenone derivative.

Embodiment 38 is a method of making a crosslinked composition comprising:

obtaining a crosslinkable composition comprising a (meth)acrylate polymer; an ultraviolet absorbing crosslinker compound; and a visible light absorbing compound of one of the following formulae (I), (II), or (III):

-continued

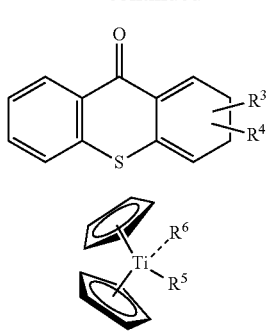
(II)

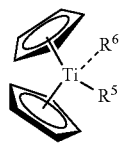
(III)

wherein
R¹ and R² are independently selected from an alkyl group, a phenyl group, an alkyl-substituted phenyl group, a heteroaromatic group, an alkyl-substituted heteroaromatic group, and R¹ and R² may be taken together to form a ring of up to seven carbons;
R³ and R⁴ are independently selected from H, a halogen, an alkyl group, and a carboxyl group;
R⁵ and R⁶ are independently selected from a phenyl group, an alkyl-substituted phenyl group, a heteroaromatic group, an alkyl- or chloride-substituted heteroaromatic group, and formula (IV):

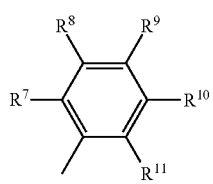
(IV)

wherein R⁷ is a halogen; R⁸ is H; R⁹ is a heteroaryl; R¹⁰ is H; and R¹¹ is a halogen; wherein 2% or less of carbon-carbon bonds in the crosslinkable composition are double bonds;
subjecting the crosslinkable composition to a first radiation to form a partially crosslinked crosslinkable composition; and
subjecting the partially crosslinked crosslinkable composition to a second radiation; wherein the first radiation and the second radiation are different; and wherein one of the first radiation and the second has a wavelength of 400 nm or greater and the other has a wavelength of less than 400 nm.

Embodiment 39 is the method of embodiment 38, wherein the ultraviolet absorbing crosslinker compound comprises. a benzotriazole, a benzatriazine, a benzophenone, or a combination thereof.

Embodiment 40 is the method of embodiment 38 or embodiment 39, wherein the radiation having a wavelength of less than 400 nm comprises radiation having a peak wavelength between 200 nm and 395 nm, inclusive.

Embodiment 41 is the method of any of embodiments 38 to 40, wherein the radiation having a wavelength of less than 400 nm comprises radiation having a peak wavelength between 300 nm and 395 nm, inclusive.

Embodiment 42 is the method of any of embodiments 38 to 41, wherein the first radiation has a wavelength of less than 400 nm.

Embodiment 43 is the method of any of embodiments 38 to 41, wherein the first radiation has a wavelength of 400 nm or greater.

Embodiment 44 is the method of any of embodiments 38 to 42, wherein the second radiation has a wavelength of 400 nm or greater.

Embodiment 45 is the method of any of embodiments 38 to 41 or 43, wherein the second radiation has a wavelength of less than 400 nm.

Embodiment 46 is the method of any of embodiments 38 to 45, wherein the first radiation, the second radiation, or both, is provided by a light emitting diode, a mercury lamp, an excimer lamp, or a combination thereof.

Embodiment 47 is the method of embodiment 46, wherein the first radiation, the second radiation, or both, is provided by a light emitting diode having a peak wavelength of 400 nm or greater.

Embodiment 48 is the method of any of embodiments 38 to 47, wherein a layer of a UV absorbing and visible light transmissive polymer or glass is disposed between the crosslinkable composition and the radiation during the subjecting the crosslinkable composition to the first radiation.

Embodiment 49 is the method of any of embodiments 38 to 47, wherein a layer of a UV absorbing and visible light transmissive polymer or glass is disposed between the crosslinkable composition and the radiation during the subjecting the partially crosslinked crosslinkable composition to the second radiation.

Embodiment 50 is the method of embodiment 48 or embodiment 49, wherein the UV absorbing and visible light transmissive polymer comprises polyethylene terephthalate.

Embodiment 51 is the method of any of embodiments 38 to 50, wherein the crosslinkable composition comprises a pressure sensitive adhesive comprising the (meth)acrylate polymer.

Embodiment 52 is the method of any of embodiments 38 to 51, wherein the crosslinkable composition further comprises a solvent.

Embodiment 53 is the method of any of embodiments 38 to 52, wherein the 2% or less of carbon-carbon bonds in the crosslinkable composition that are double bonds comprise at least one of (meth)acrylate polymer backbone bonds, (meth)acrylate polymer pendent group bonds, or (meth)acrylate monomer bonds.

Embodiment 54 is the method of any of embodiments 38 to 53, wherein the visible light absorbing compound has a peak absorbance between 400 nm and 500 nm.

Embodiment 55 is the method of any of embodiments 38 to 54, wherein R¹ and R² are independently selected from an alkyl group and a phenyl group, and R¹ and R² may be taken together to form a ring of up to seven carbons.

Embodiment 56 is the method of any of embodiments 38 to 55, wherein R³ and R⁴ are independently selected from H and a halogen.

Embodiment 57 is the method of any of embodiments 38 to 56, wherein R⁵ and R⁶ are each of formula (IV).

Embodiment 58 is the method of any of embodiments 38 to 57, wherein the visible light absorbing compound comprises camphorquinone, phenanthrenequinone, or 2-chlorothioxanthone.

Embodiment 59 is the method of any of embodiments 38 to 58, wherein the (meth)acrylate polymer comprises the reaction product of a polymerizable composition comprising a chain transfer agent, a polar monomer, and at least one alkyl (meth)acrylate.

EXAMPLES

Materials

| Designation | Description and Source |
|---|---|
| EHA | 2-Ethylhexyl acrylate, a monomer available from BASF Corporation, Florham Park, NJ. |
| IOA | Iso-octyl acrylate, a monomer obtained from 3M Company, St. Paul, MN. |
| I651 | 2,2-Dimethoxy-2-phenylacetophenone, a photo-initiator with absorbance in the ultraviolet (UV) light range available under the trade designation IRGACURE 651 from BASF Corporation, Florham Park, NJ. |
| CPQ | Camphorquinone, 2,3-bornanedione, a photo-initiator photoinitiator with absorbance in both the ultraviolet (UV) and visible light ranges available from Wilshire Technologies, Inc, Princeton, NJ. |
| I784 | Bis(eta-5-2,4-cylcopentadien-1-yl)-bis(2,6-difluoro-3-(1H-pyrrol-1-yl)-phenyl) titanium, a photoinitiator with absorbance in both the ultraviolet (UV) and visible light ranges available under the trade designation IRGACURE 784 from BASF Corporation, Florham Park, NJ. |
| I819 | Bis(2,4,6-trimethylbenzoyl)-phenylphosphineoxide, a photoinitiator with absorbance in both the ultraviolet (UV) and visible light ranges available under the trade designation IRGACURE 819 from BASF Corporation, Florham Park, NJ. |
| PQ | 9,10-Phenanthrenequinone, a photoinitiator with absorbance in both the ultraviolet (UV) and visible light ranges available from Alfa-Aesar, Ward Hill, MA. |
| CXT | 2-chlorothioxanthone, a photoinitiator with absorbance in both the ultraviolet (UV) and visible light ranges available from TCI America, Portland, OR. |
| AA | Acrylic acid, a monomer available from LG Chemical, Seoul, Korea. |
| ABP | 4-acryloyloxy benzophenone, a copolymerizable photoactivated crosslinker, prepared as described in U.S. Pat. No. 4,737,559, Example A. |
| IOTG | Isooctyl Thioglycolate, a chain transfer agent available from Evans Chemetics LP, Teaneck, NJ. |
| I1173 | 2-Hydroxy-2-methylpropiophenone, a photoinitiator with absorbance in the ultraviolet (UV) light range available under the trade designation IRGACURE 1173 from BASF SE, Ludwigshafen, Germany. |
| I4265 | 2-Hydroxy-2-methylpropiophenone and Diphenyl(2,4,6-trimethylbenzoyl)phosphine oxide mixture, a photoinitiator photoinitiator with absorbance in both the ultraviolet (UV) and visible light ranges available under the trade designation IRGACURE 4265 from BASF Corporation, Florham Park, NJ. |
| I1010 | Pentaerythritol tetrakis(3-(3,5-di-tert-butyl-4-hydroxyphenyl)propionate), an antioxidant available under the trade designation IRGANOX 1010 from BASF Corporation, Florham Park, NJ. |

Test Methods

Shear Adhesion Strength

Following ASTM Designation: D 3654/D 3654M-06: "Shear Adhesion of Pressure-Sensitive Tapes", a 0.5 inch (1.27 centimeter (cm)) wide strip of adhesive was laminated (using a 4.5 pound (2.04 kilogram (kg)) roller, twice in each direction) onto a stainless steel panel, covering a 0.5 inch by 1.0 inch (1.27 cm by 2.54 cm) area of the panel. After a dwell time of 15 minutes the test samples were placed in a vertical position on an automated timing apparatus in a controlled temperature and humidity room (23° C. and 50% relative humidity) and a 1 kilogram weight was applied as a static load. The time until failure was measured and recorded in minutes. The target value was 10,000 minutes. For each test specimen two samples were measured. A recorded time of "10000+" indicates that the adhesive did not fail after 10,000 minutes. Where samples failed in less than 10,000 minutes the failure mode was cohesive.

Degree of Crosslinking

Rheological analysis was carried out to determine the extent of crosslinking of irradiated samples. A Model AR2000 Rheometer (TA Instrument, New Castle, Del.) was used in an oscillation mode, with a temperature ramp from −60° C. to 175° C., using two 8 millimeter (mm) stainless steel plates in a parallel plate geometry, and an angular frequency of 1 radian/second. The data was acquired and analyzed using TRIOS application software provided with the rheometer. The Tan delta value at 125° C. was taken as a measure of the degree of crosslinking. Lower values of Tan delta indicated a greater degree of crosslinking, and higher values Tan delta indicated a lesser degree of crosslinking.

Preparation of Acrylic Base Polymers 1-3

Pouches containing an acrylic base polymer was prepared generally as described in U.S. Pat. No. 5,804,610, Example 23, with the compositions as shown in Table 2 below. The monomer amounts are reported at wt %, and the amounts of the other materials are reported as parts per 100 parts monomer (pph). Based on the known polymerization chemistry of acrylic acid (AA) with either isooctyl acrylate (IOA) or 2-ethylhexyl acrylate (EHA), the resulting acrylic base polymers will not contain any carbon-carbon double bonds in the polymer backbone or as pendent groups. Further, it is known that polymerization by this technique results in less than 1 wt % residual monomer.

TABLE 1

Acrylic Base Polymer Compositions

| Material | Polymer 1 | Polymer 2 | Polymer 3 |
|---|---|---|---|
| Monomers/amounts | IOA:AA/95:5 | EHA:AA/95:5 | EHA:AA/95:5 |
| IOTG | 0.035 | 0.035 | 0.035 |
| ABP | 0.10 | 0.00 | 0.15 |
| Photoinitiator | I1173 | I4265 | I651 |
| Photoinitiator amount | 0.2 | 0.2 | 0.15 |
| I1010 | 0.2 | 0.2 | 0.2 |

Preparation of Laminates

The pouches of the acrylic base polymers and, in some cases, the visible light activated photoinitiators, were compounded in a twin screw extruder (TSE) having 10 heated zones, a screw diameter of 25 millimeters an L/D (length/diameter) ratio of 46, and a screw speed of 300 rpm. A 280 gram sample was used per lot, with 140 grams for purging and 140 grams for coating. All materials were fed into Barrel 1 of the TSE. Between the extruder and the coating die, the polymer melt was metered by a gear pump (at 140° C.) through a heated hose (at 140° C.), which made the junction between the extruder and the coating die (at 140° C.). Each polymer formulation was mixed for 3 minutes and coated at a thickness of 0.003 inch (76.2 micrometers) onto the release coated side of a silicone coated polyester terephthalate (PET) release liner. This was designated release liner 1 (RL 1) and had a "high release" force. Next, a 0.002 inch (50.8 micrometers) thick PET film with a silicone release coating on one side was laminated to the exposed surface of the polymer layer, such that the release coating of the second release liner (RL 2) contacted the polymer. RL 2 had a "low release" force relative to RL 1. Several laminates were thus obtained, some with and some without visible light activated photoinitiators.

Examples 1-4

Laminates containing Polymer 1 and the visible light activated photoinitiator CPQ were prepared by irradiating the laminates with a UV or a visible light source. In some cases RL 2 was removed before irradiation. Where both RL 1 and RL 2 were present the samples were referred to as "closed face"; where only RL 1 was present the samples were referred to as "open face" and the light source was positioned above the open surface.

For UV irradiation, a UV-chamber (Model LIGHT HAMMER 10, from Fusion UV Systems, Incorporated, Gaithersburg, Md.) equipped with a D Bulb, and run at a speed of 50 feet per minute (15.24 meters per minute) to provide a total UVB energy of 250 milliJoules/square centimeter was used. The ABP component of Polymer 1 is activated in the UVB light range.

For visible irradiation, a royal blue high power LED lamp array (Part Number AW240-455F-792, having a peak wavelength between 440 and 460 nanometers and an irradiation area of 183 square centimeters, available from Clearstone Technologies, Incorporated, Hopkins, Minn.) equipped with a controller power supply (Part Number CT2000k Two, available from Clearstone Technologies, Incorporated, Hopkins, Minn.) was used. The wavelength of irradiation was measured over the range of 420 nanometers to 480 nanometers and a peak wavelength was found at about 445 nanometers. The distance between the irradiation source and the sample was 1 inch (2.54 centimeters). After one minute of visible irradiation at 50% power, the total energy as measured in the UVV channel of a UV POWER PUCK HIGH ENERGY INTEGRATING RADIOMETER (available from EIT Incorporated, Sterling, Va.) was found to be 12 Joules/square centimeter.

The resulting irradiated polymers were evaluated for Shear Adhesion Strength according to the test method above, and the results are shown in Table 2 below.

Comparative Examples 1-4

Comparative Examples 1-4, not containing CPQ, were prepared as described for Examples 1-4 and evaluated for Shear Adhesion Strength.

TABLE 2

Shear Adhesion Strength

| Ex. | Irradiation Type | Open or Closed Face | Shear Strength (minutes) |
|---|---|---|---|
| 1 | UV | Closed | 261 |
| 2 | UV | Open | 5732 |
| 3 | Visible | Closed | 10,000+ |
| 4 | Visible | Open | 10,000+ |
| CE 1 | UV | Closed | 419 |
| CE 2 | UV | Open | 10,000+ |
| CE 3 | Visible | Closed | 6 |
| CE 4 | Visible | Open | 5 |

The Shear Strength results for Examples 1 and 2 indicate that UV irradiation was more effective when an open face configuration was employed. This is due to the UV absorption characteristics of the polyester release liner films used. This same effect is seen for Comparative Examples 1 and 2.

However, when visible irradiation was employed, Examples 3 and 4, both the open and closed face configurations were able to achieve shear strengths in excess of 10,000 minutes. This is due to the ability of the visible light to pass through the polyester release liner films without being significantly absorbed and thereby activate the visible light activated photoinitiator CPQ.

In the absence of the visible light activated photoinitiator irradiation with visible light was ineffective as shown by Comparative Examples 3 and 4.

Example 5

A laminate containing Polymer 2 and CPQ was irradiated with a visible light source as described for Examples 1-4. The irradiation was done "closed faced". The resulting irradiated polymer was evaluated for Degree of Crosslinking according to the test method above, and the results are shown in Table 3 below.

Comparative Example 5

Comparative Example 5, not containing CPQ, was prepared as described for Example 5 and evaluated for Degree of Crosslinking.

TABLE 3

Degree of Crosslinking

| Ex. | Irradiation Type | Open or Closed Face | Degree of Crosslinking (Tan delta at 125° C.) |
|---|---|---|---|
| 5 | Visible | Closed | 0.27 |
| CE 5 | Visible | Closed | 2.4 |

The results in Table 3 indicate that crosslinking has taken place even though neither Example 5 nor Comparative Example 5 contained ABP in the base polymer (Polymer 2). This is due to the visible light absorbing photoinitiator CPQ by itself causing crosslinking to occur.

Several visible light absorbing photoinitiators having different peak wavelengths of absorbance as well as different reported crosslinking mechanisms were compared.

The absorbance of the various visible light activated photoinitiators at 445 nanometers was measured using a 0.3 wt % solution of the photoinitiator in acetone and scanning from 200 to 800 nanometers at 23° C. using a UV/Visible spectrophotometer.

Based on the mechanism by which initiating radicals are formed, photoinitiators are generally divided into two classes:

Type I photoinitiators undergo a unimolecular bond cleavage upon irradiation to yield free radicals.

Type II photoinitiators undergo a bimolecular reaction where the excited state of the photoinitiator interacts with a second molecule (a coinitiator) to generate free radicals.

The degree of crosslinking was also measured for irradiated laminates containing these photoinitiators.

Examples 6-9

Laminates containing Polymer 3 and various visible light activated photoinitiators were irradiated with a visible light source as described for Examples 1-4. Irradiation was done "closed faced". The photoinitiators and amounts used are shown in Table 4, along with their respective absorbances at 445 nanometers, crosslink mechanism type, and Degree of Crosslinking results.

Comparative Example 6

A laminate containing Polymer 3 only, no visible light activated photoinitiator, was irradiated with a visible light source as described for Examples 1-4. Irradiation was done "closed faced". The Degree of Crosslinking of the irradiated laminate is reported in Table 4.

Comparative Example 7

A laminate containing Polymer 3 and 1819 was irradiated with a visible light source as described for Examples 1-4. Irradiation was done "closed faced". The amount of 1819 used, along with its absorbance at 445 nanometers, crosslink mechanism type, and Degree of Crosslinking are reported in Table 4.

It can be seen from the data in Table 4 below that absorbance, crosslinking mechanism, and chemical structure are all contributing factors to the degree of crosslinking obtained.

TABLE 4

Efficiency of Visible Light Initiated Crosslinking

| Ex. | Visibly Activated Photo-initiator | Amount of Visibly Activated Photoinitiator | Cross-linking Mechanism Type | Absorbance at 445 nm | Degree of Crosslinking (Tan delta at 125° C.) |
|---|---|---|---|---|---|
| CE 6 | None | None | NA | NA | 1.3 |
| CE 7 | 1819 | 2.0 | I | 0.04 | 1.2 |
| 6 | CPQ | 2.0 | II | 0.48 | 0.3 |
| 7 | 1784 | 0.4 | II | 3.0 | 0.6 |
| 8 | PQ | 2.0 | II | 4.0 | 0.4 |
| 9 | CXT | 2.0 | II | 0.04 | 0.9 |

NA: not applicable

What is claimed is:

1. A crosslinkable composition comprising:
   a (meth)acrylate polymer; and
   a visible light absorbing compound of one of the following formulae (I), (II), or (III):

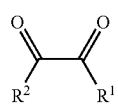

(I)

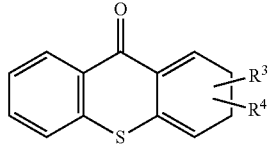

(II)

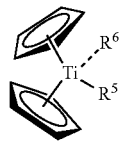

(III)

wherein
$R^1$ and $R^2$ are independently selected from an alkyl group, a phenyl group, an alkyl-substituted phenyl group, a heteroaromatic group, an alkyl-substituted heteroaromatic group, and $R^1$ and $R^2$ may be taken together to form a ring of up to seven carbons;
$R^3$ and $R^4$ are independently selected from H, a halogen, an alkyl group, and a carboxyl group;
$R^5$ and $R^6$ are independently selected from a phenyl group, an alkyl-substituted phenyl group, a heteroaromatic group, an alkyl- or chloride-substituted heteroaromatic group, and formula (IV):

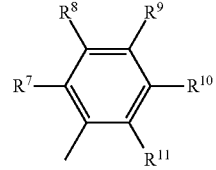

(IV)

wherein
$R^7$ is a halogen;
$R^8$ is H;
$R^9$ is a heteroaryl;
$R^{10}$ is H; and
$R^{11}$ is a halogen;
wherein 2% or less of carbon-carbon bonds in the crosslinkable composition are double bonds.

2. The crosslinkable composition of claim 1, wherein the crosslinkable composition comprises a pressure sensitive adhesive comprising the (meth)acrylate polymer.

3. The crosslinkable composition of claim 1, wherein the (meth)acrylate polymer is partially crosslinked.

4. The crosslinkable composition of claim 1, wherein the 2% or less carbon-carbon double bonds comprise at least one of (meth)acrylate polymer backbone bonds, (meth)acrylate polymer pendent group bonds, or (meth)acrylate monomer bonds.

5. The crosslinkable composition of claim 1, wherein the visible light absorbing compound has a peak absorbance between 400 nm and 500 nm.

6. The crosslinkable composition of claim 1, wherein $R^1$ and $R^2$ are independently selected from an alkyl group and a phenyl group, and $R^1$ and $R^2$ may be taken together to form a ring of up to seven carbons.

7. The crosslinkable composition of claim 1, wherein $R^3$ and $R^4$ are independently selected from H and a halogen.

8. The crosslinkable composition of claim 1, wherein $R^5$ and $R^6$ are each of formula (IV).

9. The crosslinkable composition of claim 1, wherein the (meth)acrylate polymer comprises the reaction product of a polymerizable composition comprising a chain transfer agent, a polar monomer, and at least one alkyl (meth)acrylate.

10. The crosslinkable composition of claim 9, wherein the polymerizable composition further comprises an ultraviolet radiation absorbing compound.

11. The crosslinkable composition of claim 1, wherein the (meth)acrylate polymer comprises at least one ultraviolet radiation absorbing functional group.

12. A method of making a crosslinked composition, the method comprising:
obtaining a crosslinkable composition according to claim 1; and
subjecting the crosslinkable composition to radiation having a wavelength of 400 nm or greater.

13. The method of claim 12, wherein the (meth)acrylate polymer is formed by solution polymerization, emulsion polymerization, suspension polymerization, or bulk polymerization.

14. The method of claim 12, wherein the radiation is provided by a light emitting diode, a mercury lamp, an excimer lamp, or a combination thereof.

15. The method of claim 14, wherein the radiation is provided by a light emitting diode having a peak wavelength of 400 nm or greater.

16. The method of claim 12, wherein a layer of a UV absorbing and visible light transmissive polymer or glass is disposed between the crosslinkable composition and the radiation during the subjecting the crosslinkable composition to the radiation.

17. A method of making a crosslinked composition, the method comprising:
obtaining a crosslinkable composition comprising a (meth)acrylate polymer; an ultraviolet absorbing crosslinker compound; and a visible light absorbing compound of one of the following formulae (I), (II), or (III):

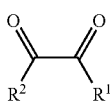
(I)

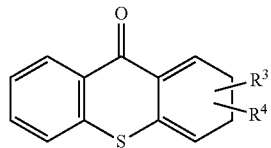
(II)

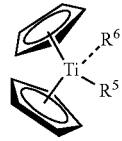
(III)

wherein
$R^1$ and $R^2$ are independently selected from an alkyl group, a phenyl group, an alkyl-substituted phenyl group, a heteroaromatic group, an alkyl-substituted heteroaromatic group, and $R^1$ and $R^2$ may be taken together to form a ring of up to seven carbons;
$R^3$ and $R^4$ are independently selected from H, a halogen, an alkyl group, and a carboxyl group;
$R^5$ and $R^6$ are independently selected from a phenyl group, an alkyl-substituted phenyl group, a heteroaromatic group, an alkyl- or chloride-substituted heteroaromatic group, and formula (IV):

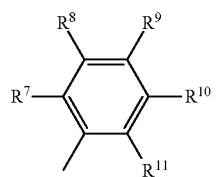
(IV)

wherein
$R^7$ is a halogen;
$R^8$ is H;
$R^9$ is a heteroaryl;
$R^{10}$ is H; and
$R^{11}$ is a halogen;
wherein 2% or less of carbon-carbon bonds in the crosslinkable composition are double bonds;
subjecting the crosslinkable composition to a first radiation to form a partially crosslinked crosslinkable composition; and
subjecting the partially crosslinked crosslinkable composition to a second radiation;
wherein the first radiation and the second radiation are different; and wherein one of the first radiation and the second has a wavelength of 400 nm or greater and the other has a wavelength of less than 400 nm.

\* \* \* \* \*